United States Patent
Wallman et al.

(10) Patent No.: US 6,799,185 B2
(45) Date of Patent: Sep. 28, 2004

(54) FRAMEWORKS FOR ACCESSING JAVA CLASS FILES

(75) Inventors: David Wallman, Sunnyvale, CA (US); Stepan Sokolov, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 210 days.

(21) Appl. No.: 09/852,463

(22) Filed: May 9, 2001

(65) Prior Publication Data

US 2004/0015855 A1 Jan. 22, 2004

(51) Int. Cl.$^7$ .............................................. G06F 17/30
(52) U.S. Cl. .................. 707/103 R; 707/102; 707/205; 717/136; 717/148
(58) Field of Search ................................. 707/206, 102, 707/103 R, 205; 709/213, 320; 345/418; 717/136, 148, 166

(56) References Cited

U.S. PATENT DOCUMENTS

| | | | | | |
|---|---|---|---|---|---|
| 6,061,743 | A | * | 5/2000 | Thatcher et al. | 709/328 |
| 6,083,279 | A | * | 7/2000 | Cuomo et al. | 717/118 |
| 6,295,638 | B1 | * | 9/2001 | Brown et al. | 717/148 |
| 6,336,213 | B1 | * | 1/2002 | Beadle et al. | 717/136 |
| 6,339,841 | B1 | * | 1/2002 | Merrick et al. | 717/166 |
| 6,429,860 | B1 | * | 8/2002 | Hughes | 345/418 |
| 6,442,558 | B1 | * | 8/2002 | Brown et al. | 707/102 |
| 6,453,342 | B1 | * | 9/2002 | Himmel et al. | 709/213 |
| 6,584,612 | B1 | * | 6/2003 | Mueller et al. | 717/166 |
| 2002/0087589 | A1 | * | 7/2002 | Wallman | 707/206 |

OTHER PUBLICATIONS

Lindholm et al, "The Java™ Virtual Machine Specification", (Sep. 1996), Sun Microsystems, Inc., Chapters 1–10 (173 pp.).
Hummel, Joseph et al., "Annotating the Java bytecodes in support of optimization", 1997, *Concurrency: Practice and Experience*, vol. 9, No. 11, pp. 1003–1016. XP–001131083.
Pominville, Patrice, "Annotating Java Bytecode", 2000, *McGill University, 308–621 Optimizing Compilers, Project Report*, pp. 1–7. XP–002252576.

* cited by examiner

Primary Examiner—Charles Rones
(74) Attorney, Agent, or Firm—Beyer Weaver & Thomas, LLP (57) ABSTRACT

Improved techniques for accessing Java class files are disclosed. The techniques provide a mechanism that will generally improve the efficiency of virtual machines by providing a directory for Java class files. The directory can be implemented as an attribute in the attribute portion of the Java class files. Various components of the Java class file can be accessed efficiently by using the directory. In addition, techniques for accessing various components of Java class files using directories are disclosed. The techniques utilize the directory to allow efficient access to the class file. Thus, unlike conventional techniques, there is no need to perform sequential reads in order to locate various components of the Java class file. This allows for better use of resources. As a result, the invention can improve the performance of virtual machines, especially those that operate with limited resources (e.g., embedded systems).

22 Claims, 6 Drawing Sheets

```
ClassFile {
    u4 magic;
    u2 minor_version;
    us major_version;
    u2 constant_pool_count;
    cp_info constant_pool[constant_pool_count-1];
    u2 access_flags;
    u2 this_class;
    u2 super_class;
    u2 interfaces_count;
    u2 interfaces[interfaces_count];
    u2 fields_count;
    field_info fields[fields_count];
    u2 methods_count;
    method_info methods[methods_count];
    u2 attributes_count;
    attribute_info attributes[attributes_count];
```

FRAMEWORKS FOR ACCESSING JAVA CLASS FILES

BACKGROUND OF THE INVENTION

The Field of the Invention

The present invention relates generally to object-oriented programming environments, and more particularly, to improved techniques for accessing Java class files.

Recently, the Java programming environment has become quite popular. The Java programming language is a language that is designed to be portable enough to be executed on a wide range of computers ranging from small devices (e.g., pagers, cell phones and smart cards) up to supercomputers. Computer programs written in the Java programming language (and other languages) may be compiled into Java Bytecode instructions that are suitable for execution by a Java virtual machine implementation.

The Java virtual machine is commonly implemented in software by means of an interpreter for the Java virtual machine instruction set but, in general, may be software, hardware, or both. A particular Java virtual machine implementation and corresponding support libraries together constitute a Java runtime environment.

Computer programs in the Java programming language are arranged in one or more classes or interfaces (referred to herein jointly as classes or class files). Such programs are generally platform, i.e., hardware and operating system, independent. As such, these computer programs may be executed without modification on any computer that is able to run an implementation of the Java™ runtime environment.

Figure 1A:
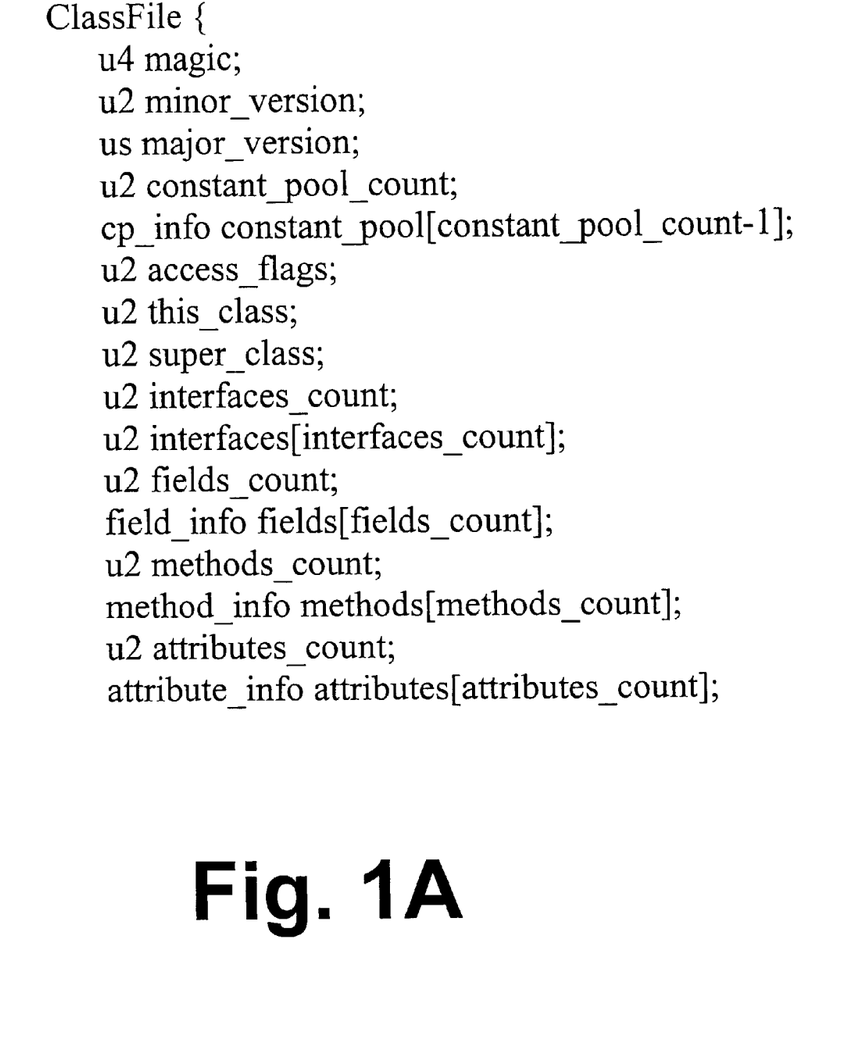
FIG. 1A illustrates a class file structure.

Object-oriented classes written in the Java programming language are compiled to a particular binary format called the "class file format." The class file includes various components associated with a single class. These components typically include methods, interfaces, fields, and constant pool associated with the class. In addition, the class file format can include a significant amount of ancillary information that is associated with the class. The class file format is shown in FIG. 1A. The class file format (as well as the general operation of the Java virtual machine) is described in some detail in *The Java™ Virtual Machine Specification. Second Edition*, by Tim Lindholm and Frank Yellin, which is hereby incorporated herein by reference.

Figure 1B:
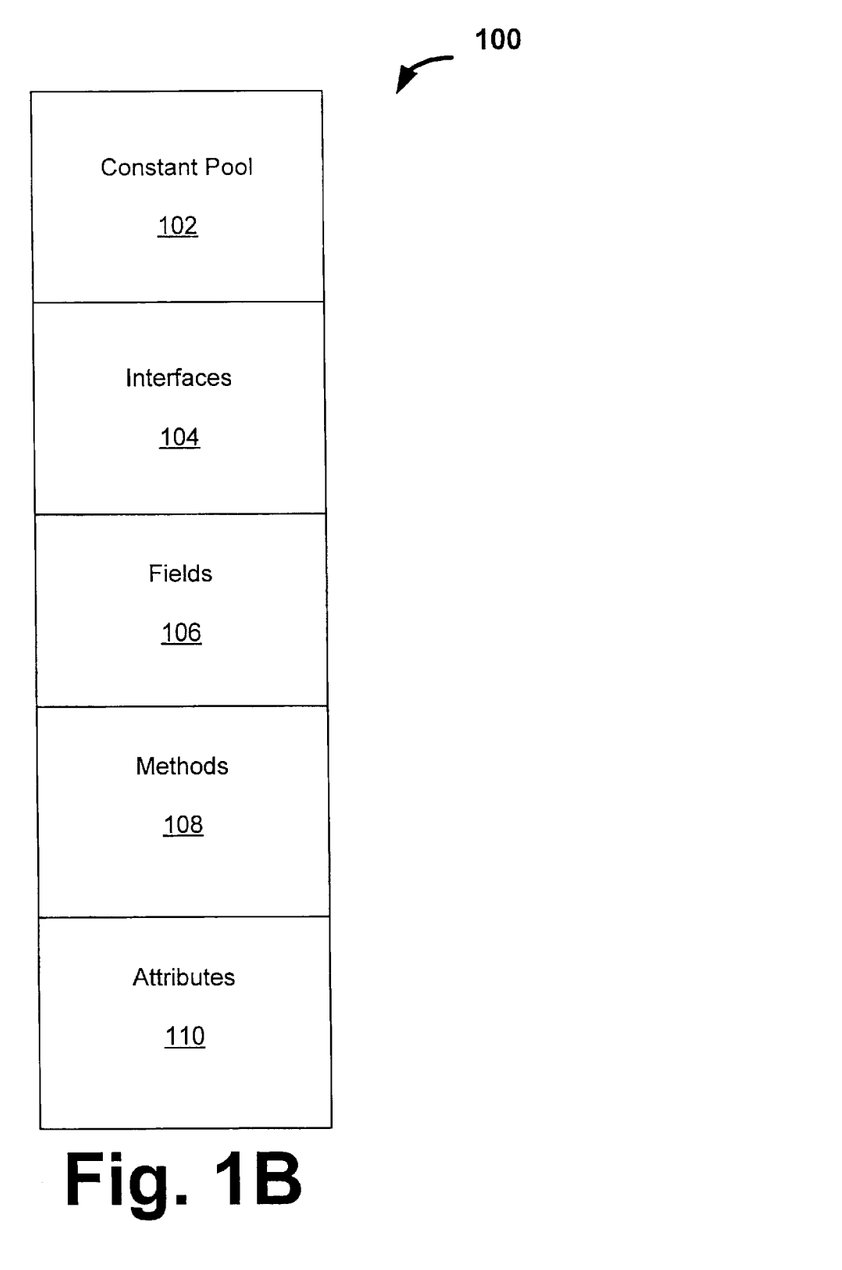
FIG. 1B illustrates a simplified class file.

FIG. 1B illustrates a simplified class file 100. As shown in FIG. 1B, the class file 100 includes a constant pool 102 portion, interfaces portion 104, fields portion 106, methods portion 108, and attributes portion 110. The attributes (or attributes table) 110 portion represents the attributes associated with the class file 100. This allows for one or more attributes to be defined, each of which can be associated with one or more components of the class file. As is known to those skilled in the art, the Java virtual machine implementations are allowed to define and use various attributes. In addition, the virtual machine's implementations ignore attributes that they do not recognize. Thus, a class file may contain one or more attributes, all or none of which may be recognized and/or of interest to a particular virtual machine implementation.

It should be noted that the constant pool 102, interfaces 104, fields 106, methods 108, and attributes 110 can have variable lengths. Thus, typically, the virtual machine needs to sequentially read the class file to find, for example, a particular attribute. However, the particular attribute may not even be contained in the class file, and even if the class file contains this attribute, the process of finding the attribute and then finding various components associated with the attribute can be very costly and/or time consuming. This is partially due to the fact that each of the various portions of the class file may contain hundreds of components with various lengths. Thus, conventionally accessing components of class files can be grossly inefficient. This inefficiency can adversely effect performance of virtual machines, especially those operating with relatively limited memory and/or processing power (e.g., embedded systems).

In view of the foregoing, improved techniques for accessing class files are needed.

SUMMARY OF THE INVENTION

Broadly speaking, the present invention relates to improved techniques for accessing Java class files. One aspect of the present invention seeks to provide a mechanism that will generally improve the efficiency of virtual machines by providing a directory for Java class files. The directory can be implemented as an attribute in the attribute portion of the Java class files. As will be appreciated, various components of the Java class file can be accessed efficiently by using the directory. In addition, techniques for accessing various components of Java class files using directories are disclosed. The techniques utilize the directory to allow efficient access to the class file. Thus, unlike conventional techniques, there is no need to perform sequential reads in order to locate various components of the Java class file. This allows for better use of resources. As a result, the invention can improve the performance of virtual machines, especially those that operate with limited resources (e.g., embedded systems).

The invention can be implemented in numerous ways, including as a method, an apparatus, a computer readable medium, and a database system. Several embodiments of the invention are discussed below.

As a method for accessing components of a Java class file, one embodiment of the invention includes the acts of: accessing a directory of the Java class file, wherein the directory lists at least one component of the Java class file; and determining whether one or more components of the Java class file are listed in the directory.

As a method for determining whether a Java class file has an attribute, one embodiment of the invention includes the acts of: determining whether a Java class file has a directory; reading the directory when it is determined that the Java class file has a directory; determining whether at least one attribute is listed in the directory.

As a Java class file suitable for loading into a virtual machine, one embodiment of the invention includes a directory that lists one or more components of the class. The directory includes information relating to the one or more listed components.

As a computer readable media including computer program code for a Java class file suitable for loading into a virtual machine, one embodiment of the invention includes the Java class file directory that lists one or more components of the class file. In addition, the directory provides information relating to one or more components of the class file.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As described in the background section, the Java programming environment has enjoyed widespread success. Therefore, there are continuing efforts to extend the breadth of Java compatible devices and to improve the performance of such devices. One of the most significant factors influencing the performance of Java based programs on a particular platform is the performance of the underlying virtual machine. Accordingly, there have been extensive efforts by a number of entities to provide improved performance to Java compliant virtual machines. In order to be Java compliant, a virtual machine must be capable of working with Java classes which have a defined class file format. Although it is important that any Java virtual machine be capable of handling Java classes, the Java virtual machine specification does not dictate how such classes are represented internally within a particular Java virtual machine implementation. In addition, in accordance with the Java virtual machine specification, new class attributes can be defined for, and used by, Java virtual machine implementations.

The present invention pertains to improved techniques for accessing Java class files. One aspect of the present invention seeks to provide a mechanism that will generally improve the efficiency of virtual machines by providing a directory for Java class files. The directory can be implemented as an attribute in the attribute portion of the Java class files. As will be appreciated, various components of the Java class file can be accessed efficiently by using the directory. In addition, techniques for accessing various components of Java class files using directories are disclosed. The techniques utilize the directory to allow efficient access to the class file. Thus, unlike conventional techniques, there is no need to perform sequential reads in order to locate various components of the Java class file. This allows for better use of resources. As a result, the invention can improve the performance of virtual machines, especially those that operate with limited resources (e.g., embedded systems).

Embodiments of the invention are discussed below with reference to FIGS. 2–5. However, those skilled in the art will readily appreciate that the detailed description given herein with respect to these figures is for explanatory purposes as the invention extends beyond these limited embodiments.

Figure 2:
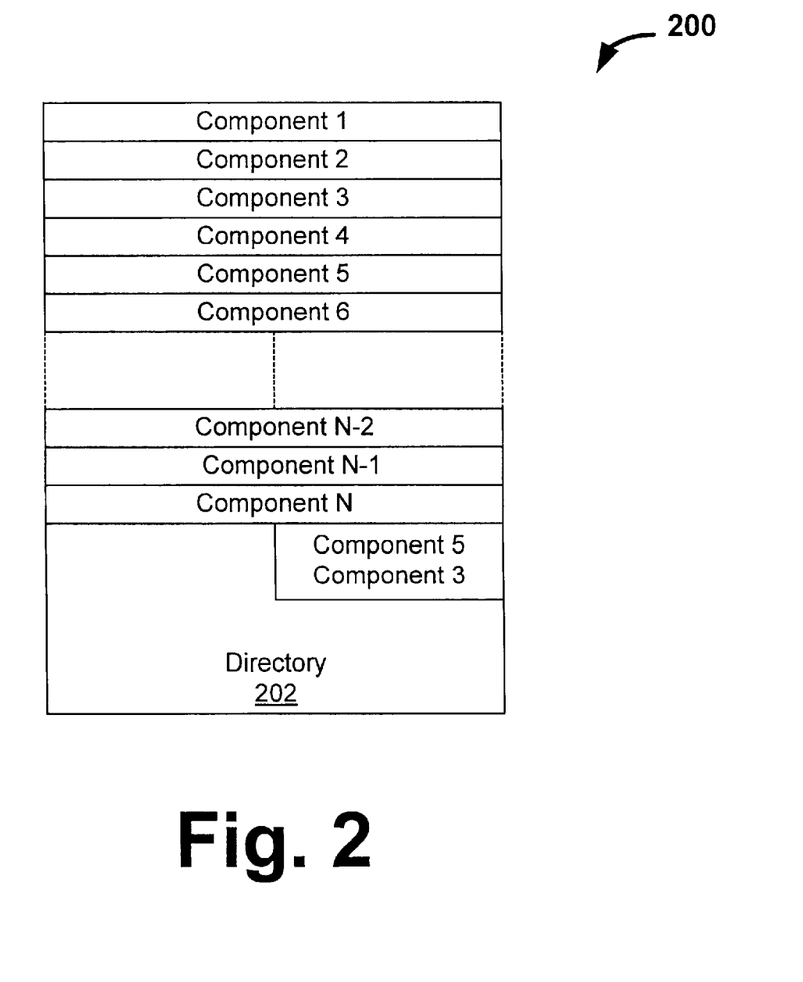
FIG. 2 illustrates a Java class file including a directory in accordance with one embodiment of the invention.

FIG. 2 illustrates a Java class file 200 including a directory 202 in accordance with one embodiment of the invention. The directory 202 can be implemented as an attribute in the attribute portion of the Java class file 200. The directory 202 can list one or more of the components of the class file 200, for example, components 3 and 5 of components 1-N. In addition, the directory 202 can include information about the listed components (e.g., components 3 and 5).

Figure 3:
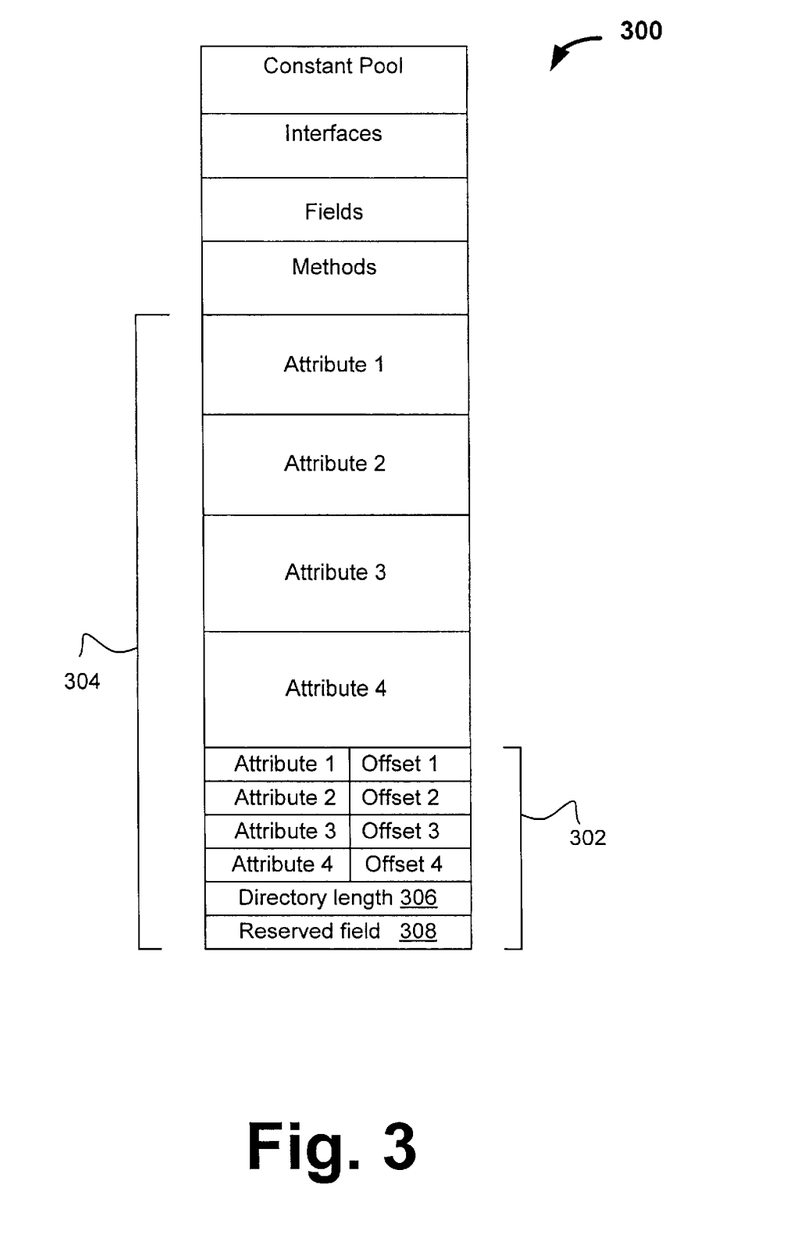
FIG. 3 depicts a Java class file including a directory in accordance with another embodiment of the invention.

To illustrate, FIG. 3 depicts a Java class file 300 including a directory 302 in accordance with another embodiment of the invention. The directory 302 is implemented in the attribute portion 304 of the Java class file 300. More specifically, the directory 302 is the last attribute in the attribute portion (attribute table) 304. As shown in FIG. 3, the attribute portion (attribute table) 304 includes Attribute 1, Attribute 2, Attribute 3 and Attribute 4. Thus, in this example, the directory 302 can be considered to be the last attribute that is defined for the Java class file 300 (i.e., Attribute 5).

The directory 302 lists the attributes of the class file. In addition, the directory 302 contains the offsets for each of the attributes. More specifically, Offset 1, Offset 2, Offset 3 and Offset 4 respectively represent the offsets for Attribute 1, Attribute 2, Attribute 3 and Attribute 4 of the class file 300. Thus, the directory 302 can provide an index table for attributes defined for the Java class file 300. In addition, the directory 302 can include other ancillary information, for example, a Directory length field 306 and a Reserved field 308. The Directory length field 306 can be used to store the length of the directory 302. The last N Bytes of the directory 302 are reserved as the Reserved field 308 which can be set to a predetermined value (e.g., a particular string) to indicate that the class file 300 has a directory.

Figure 4:
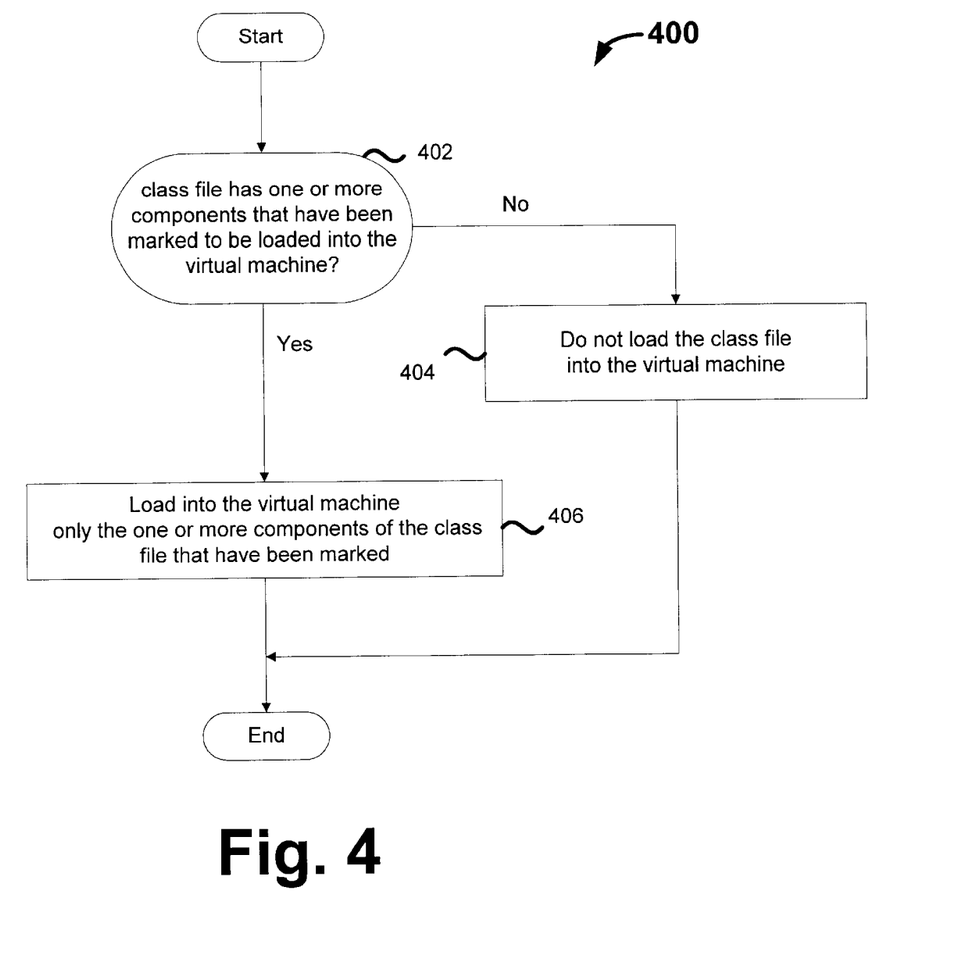
FIG. 4 illustrates a method for accessing a Java class file in accordance with one embodiment of the invention.

As noted above, the directory can be used to efficiently access the Java class file. FIG. 4 illustrates a method 400 for accessing a Java class file in accordance with one embodiment of the invention. Initially, at operation 402, a determination is made as to whether one or more components of the class file are listed in the directory portion of the class file. If it is determined at operation 402 that one or more components of the class file are not listed in the directory portion of the class file, the method proceeds to operation 404 where conventional processing is performed to access the one or more components of the Java class file (i.e., sequential reading of the class file is performed). The method 400 ends following operation 404. On the other hand, if it is determined at operation 402 that one or more components of the Java class file are listed in the directory portion of the class file, the method 400 proceeds to operation 406 where one or more components of the Java class file are accessed based on the information found in the directory. The method 400 ends following operation 406.

Figure 5:
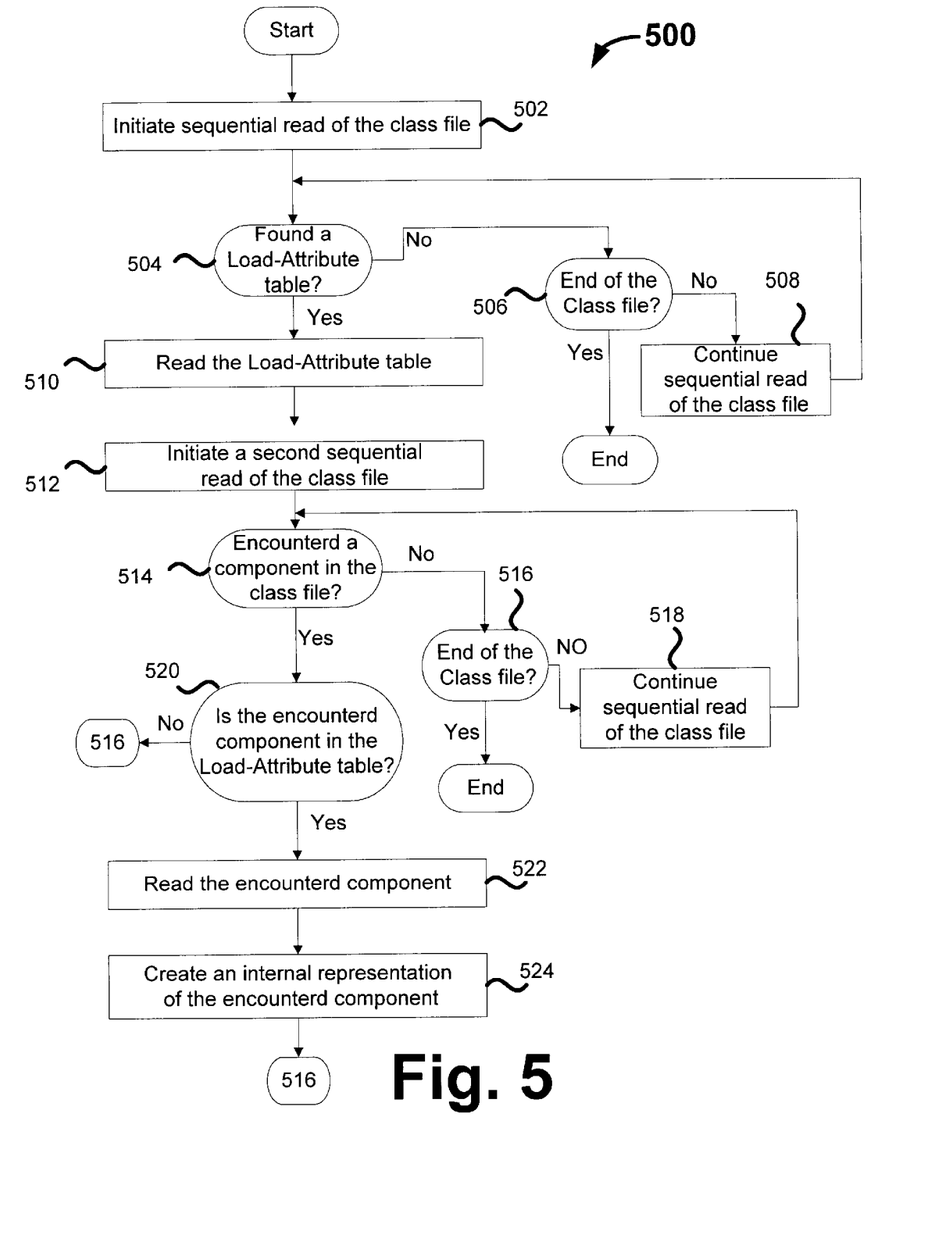
FIG. 5 illustrates in greater detail a method for accessing a Java class file in accordance with another embodiment of the invention.

FIG. 5 illustrates in greater detail a method 500 for accessing a Java class file in accordance with another embodiment of the invention. Initially, at operation 502, the last N bytes of the class file are read. As noted above, the last N bytes of the class file can be reserved and set to a predetermined value (e.g., a string) when the class file 502 has a directory. Next, at operation 504, a determination is made as to whether the last N bytes of the class file contains the predetermined value which indicates that the Java class file has a directory. If it is determined at operation 504 that the last N bytes of the class file does not contain the predetermined value, the method 500 proceeds to operation 506 where conventional processing is performed. The method 500 ends following operation 506. However, if it is determined at operation 504 that the last N bytes of the class file contains the predetermined value (i.e., that the class file has a directory), the method 500 proceeds to operation 508 where the length field of the directory is read. Next, at operation 510, the directory is read. Thereafter, at operation 512, it is determined whether the directory lists at least one attribute that is of interest. If it is determined at operation 512 that the directory does not list at least one attribute that is of interest, the method 500 ends. However, if it is determined at operation 512 that the directory lists at least one attribute that is of interest, the method 500 proceeds to operation 514 where information relating to the at least one attribute is obtained from the directory. This information can, for example, include the offset of the attribute in the attribute table, the offsets of Bytecodes associated with that attribute, and so on. Finally, at operation 516, one or more Bytecodes of the Java class file can be accessed based on the information obtained from the directory. The method 500 ends following operation 516.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of determining whether a Java classfile has an attribute, said method comprising:

providing a directory in a Java classfile as one of attributes of said Java classfile, wherein said directory lists one or more attributes of said Java classfile;

reading said directory; and determining whether a first attribute is listed in said directory of said Java classfile.

2. A method of determining whether a Java classfile has an attribute, said method comprising:

determining whether a Java classfile has a directory;

reading said directory when said determining determines that said Java classfile has a directory;

determining whether at least one attribute is listed in said directory;

wherein said directory lists one or more attributes associated with said Java classfile, and wherein said determining of whether said Java classfile has a directory operates to determine whether the last N bytes of said Java classfile contain a predetermined value, and wherein N is a positive integer.

3. A method as recited in claim 2 wherein said directory includes a length field which can be used to determine the length of said directory.

4. A method as recited in claim 2, wherein said directory includes offsets of one or more Bytecodes of said Java classfile; and wherein said one or more Bytecodes can be associated with an interface, a field, a method or a constant pool of said Java file.

5. A method of loading Java classes of a Java classfile, said method comprising:

providing a java classfile that includes a directory which is implemented as one of the attributes of said Java classfile, wherein said directory lists one or more attributes of said Java classfile, and wherein each one of said one or more attributes represents a Java class that is to be loaded;

accessing said directory of said Java classfile; and loading only said one or more Java classes that are listed in said directory.

6. A method as recited in claim 5, wherein said method is performed by a virtual machine.

7. A method as recited in claim 6, wherein said virtual machine operates as an embedded or mobile device.

8. A method of accessing components of a Java classfile, said method comprising:

providing a java classfile that includes a directory therein, wherein said directory is implemented as one of the attributes of said Java classfile, and said directory lists at least one component including at least one attribute of said Java classfile;

accessing said directory of said Java classfile; and determining whether one or more components of said Java classfile are listed in said directory.

9. A method as recited in claim 8, wherein said method further comprises:

determining whether said Java classfile has a directory, and wherein said accessing of the directory is performed only when it is determined that said Java classfile has a directory.

10. A method as recited in claim 8, wherein said method further comprises:

obtaining information relating to said one or more components from said directory; and accessing one or more components of said Java classfile based on said obtained information.

11. A method as recited in claim 8, wherein said directory further includes information that can be used to find one or more components of said Java classfile.

12. A method as recited in claim 11, wherein said method further comprises:

accessing said one or more components of said Java classfile based on said information of said directory.

13. A method as recited in claim 8, wherein said one or more components of said classfile can be an interface, a field, a method, or an attribute associated with said Java classfile.

14. A method as recited in claim 8, wherein said directory is implemented as the last attribute in said classfile.

15. A method as recited in claim 8, wherein said directory includes a length field which can be used to determine the length of said directory.

16. A method as recited in claim 8, wherein N bytes of said Java classfile are set to a predetermined value when said Java classfile has a directory, and wherein N is a positive integer.

17. A computer readable medium including computer program code for providing a Java classfile suitable for loading into a virtual machine, wherein said Java classfile comprises:

a directory implemented therein as one of said attributes of said Java classfile, wherein said directory lists one or more components of said classfile including at least one attribute of said Java classfile, and wherein said directory includes information relating to said one or more listed components.

18. A computer readable medium including computer program code for a Java classfile as recited in claim 17, wherein said directory is implemented as the last attribute of said Java classfile, and wherein said directory lists one or more attributes associated with said Java classfile.

19. A computer readable medium including computer program code for a Java classfile as recited in claim 18, wherein said directory includes offsets of one or more Bytecodes of said Java classfile; and wherein said one or more Bytecodes can be associated with an interface, a field, a method or a constant pool of said Java file.

20. A virtual machine that is capable of operating to:

read a java classfile that includes a directory which is implemented as one of the attributes of said Java classfile, wherein said directory lists one or more attributes of said Java classfile, and wherein each one of said one or more attributes represents a Java class that is to be loaded.

21. A virtual machine as recited in claim 20, wherein said is further capable of operating to:

access said directory of said Java classfile; and load only said one or more Java classes that are listed in said directory.

22. A virtual machine as recited in claim 20, wherein virtual machine operates as an embedded or mobile device.

* * * * *